United States Patent [19]

Guillet et al.

[11] Patent Number: 5,178,210
[45] Date of Patent: Jan. 12, 1993

[54] VAPOR PUMP EMPLOYING COUNTERFLOW EXCHANGE BETWEEN AIR AND COMBUSTION PRODUCTS WITHOUT AN INTERMEDIATE FLUID

[75] Inventors: Rémi Guillet, Pierrefitte; Georges Baeckeroot, Germigny l'Eveque, both of France

[73] Assignee: Gaz de France, Paris, France

[21] Appl. No.: 600,196

[22] Filed: Oct. 18, 1990

[30] Foreign Application Priority Data

Oct. 24, 1989 [FR] France ................. 89 13945

[51] Int. Cl.$^5$ .................. F28B 1/06; F23D 11/44
[52] U.S. Cl. .................. 165/111; 165/909; 431/4; 431/210; 431/163; 261/152; 261/153; 122/DIG. 1; 60/39.59
[58] Field of Search .............. 165/911, 913, 111, 909; 431/4, 163, 210, 211; 261/153, 152, 161, 143, 149, DIG. 83; 122/DIG. 1, DIG. 2; 60/39.59

[56] References Cited

U.S. PATENT DOCUMENTS

| 3,971,847 | 7/1976 | Houseman | 431/4 |
|---|---|---|---|
| 4,075,831 | 2/1978 | McGann | 60/39.59 |

FOREIGN PATENT DOCUMENTS

| 230193 | 7/1987 | European Pat. Off. . | |
| 2446460 | 8/1980 | France . | |
| 111161 | 8/1979 | Japan | 261/152 |
| 148723 | 10/1931 | Switzerland . | |
| 2103510 | 2/1983 | United Kingdom . | |
| 2112517 | 7/1983 | United Kingdom . | |

Primary Examiner—Albert W. Davis, Jr.

[57] ABSTRACT

The vapor pump constituted by a mass and heat exchanger comprises an outer enclosure, a set of exchanger tubes disposed inside the enclosure and extending lengthwise therein, opening out at one of the ends in a first radial plane and at their other ends in a second radial plane, which radial planes include means for positioning and supporting the tubes and for closing the empty spaces in the section of the enclosure situated outside the tubes, thereby defining between said radial planes both a first gaseous fluid flow circuit inside the tubes, and a distinct counterflow second fluid flow circuit inside the enclosure but outside the tubes. One of the first and second gaseous fluids constituted by moist hot combustion products from a thermal process while the other gaseous fluid is constituted by new combustion air. Humidifier means are provided for humidifying the air inserted into the enclosure. These means comprise a set of nozzles disposed in such a manner as to spray a fine mist of water into the volume occupying at least the entire inlet flow section to the air flow circuit and the entire outlet flow section of the air flow circuit, such that only the faces of the walls of the tubes that are in contact with the air are moistened.

17 Claims, 6 Drawing Sheets

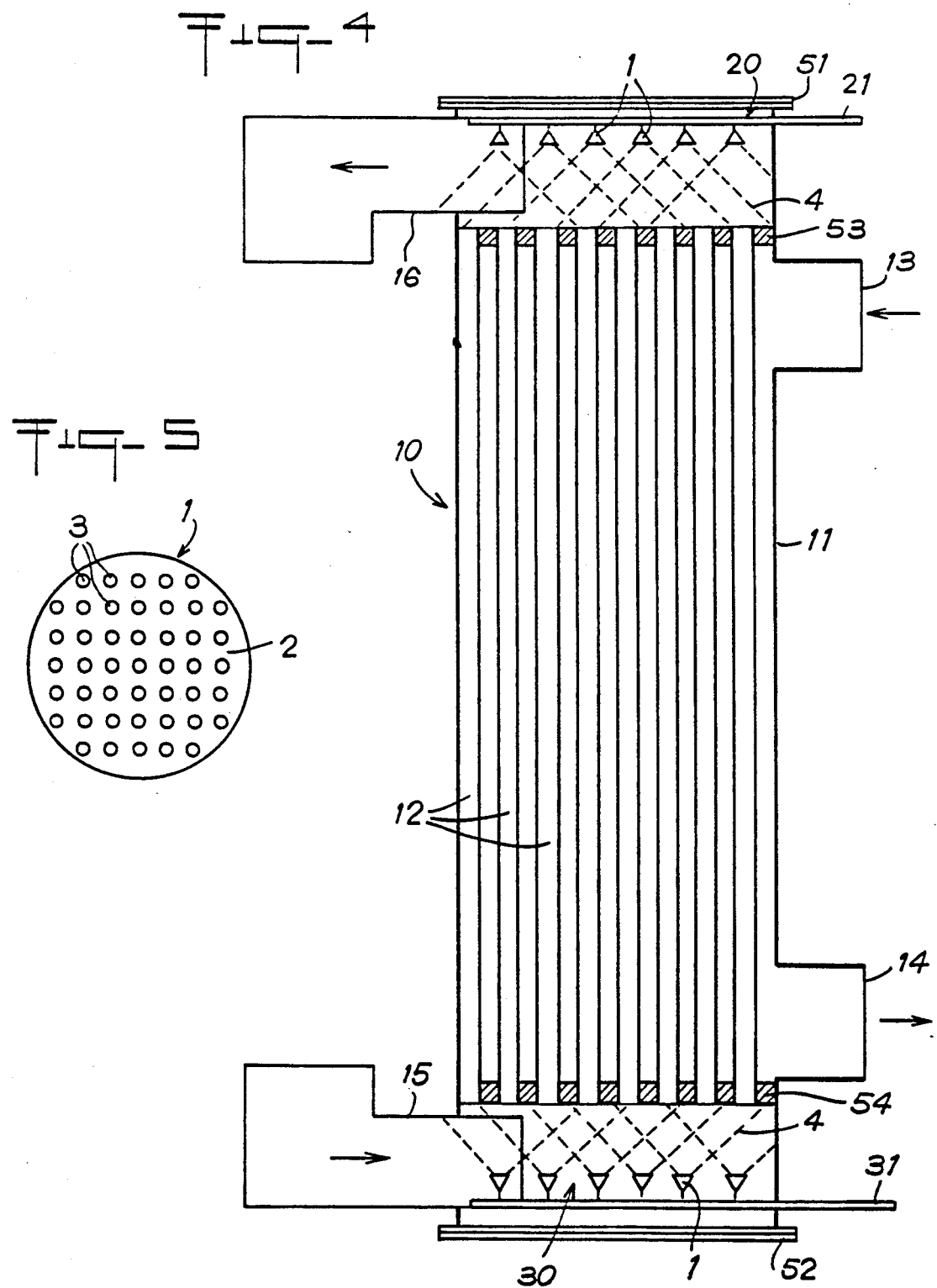

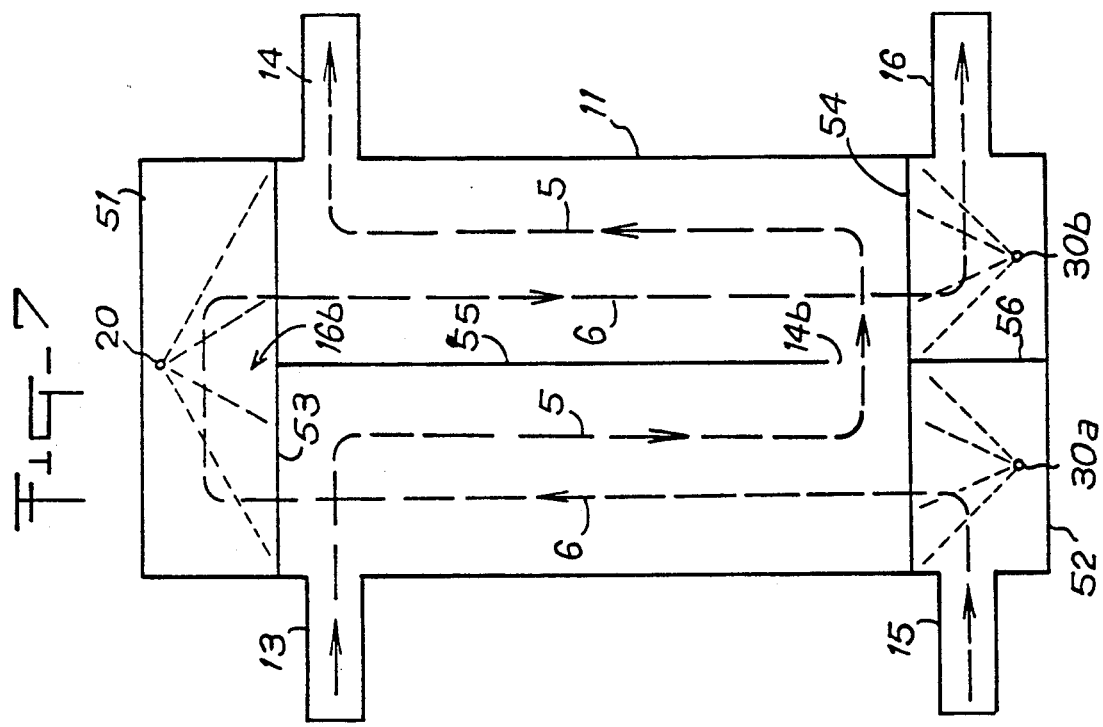
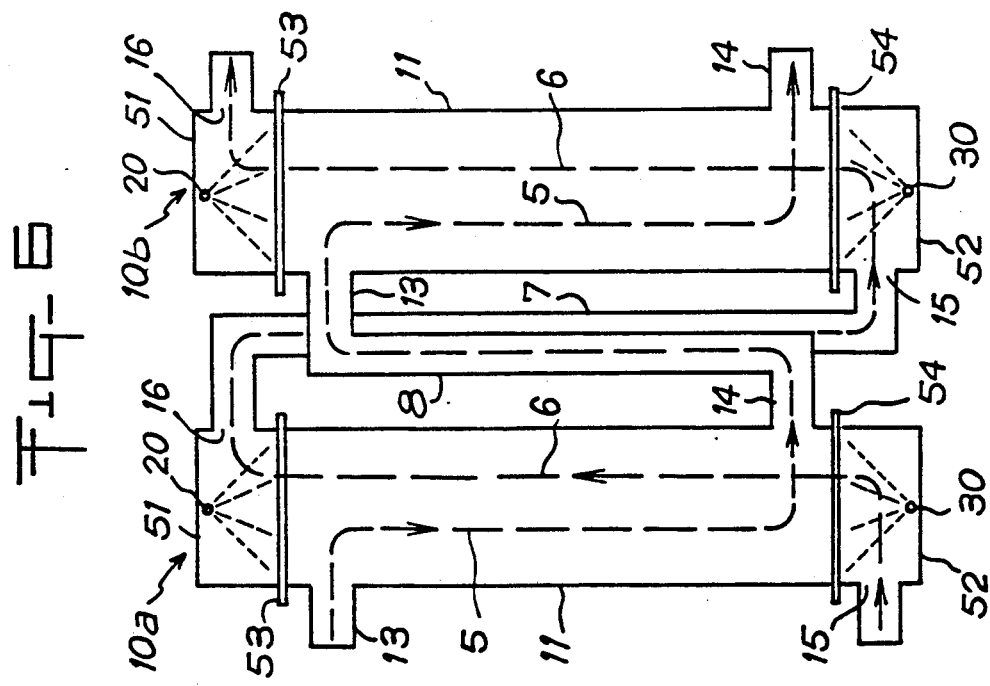

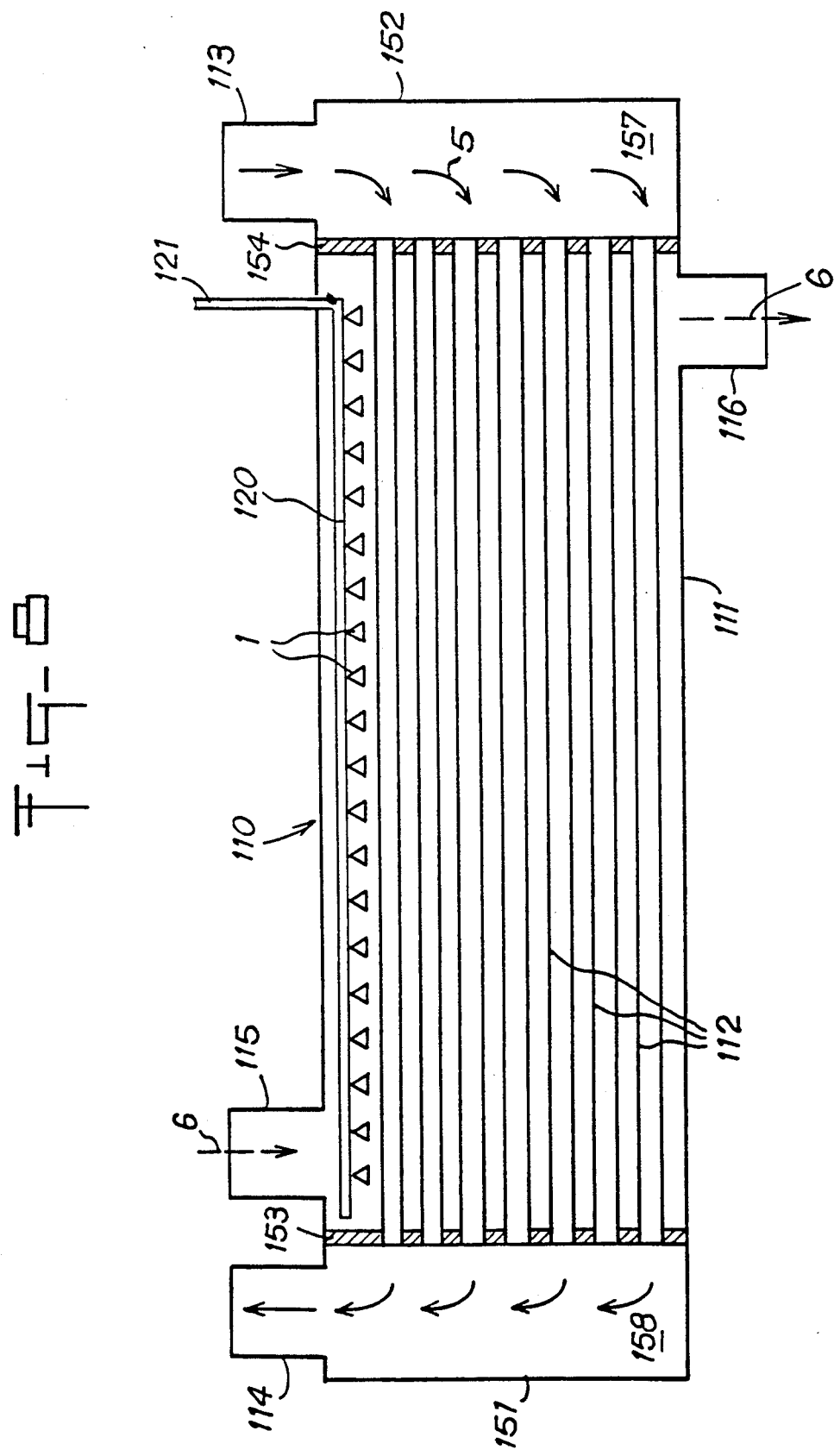

VAPOR PUMP EMPLOYING COUNTERFLOW EXCHANGE BETWEEN AIR AND COMBUSTION PRODUCTS WITHOUT AN INTERMEDIATE FLUID

The present invention relates to a vapor pump constituted by a mass and heat exchangers which transfer energy between the combustion products from a thermal process and incoming combustion air.

BACKGROUND OF THE INVENTION

Several types of mass and heat exchanger or "vapor pump" are already known which enable a greater or lesser fraction of the sensible and the latent heat contained in the combustion products leaving a condensation generator to be recycled with the combustion air required by the thermal process.

Thus, Document FR-B-2 446 460 proposes a condensation heating installation including a heat exchanger/regenerator for thermally coupling the combustion air required by the heat generator and the combustion products from the heat generator, with humidifier means being provided to extract at least a portion of the condensates from the combustion products and to put these condensates into contact with the combustion air. This prior heat exchanger comprises a plurality of juxtaposed compartments separated by vertical partitions and communicating at their ends with bottom and top chambers, a first series of alternate compartments having their first ends in communication with a first bottom chamber and their second ends in communication with a first top chamber, while the compartments immediately adjacent to the alternate compartments of the first series are in communication with a second top chamber via their ends close to said first ends and with a second bottom chamber via their ends close to said second ends. The alternate compartments in communication with the first top and bottom chambers have air to be reheated flowing through them, while the alternate compartments in communication with the second top and bottom chambers have combustion products flowing through them. A first series of condensate feed strips is installed at the top end of the compartments in the second series while a second series of condensate feed strips is installed at the top end of the compartments in the second series. If it is desired to obtain high efficiency, a heat and mass exchanger of this type turns out to be expensive, difficult to implement, and very bulky. In addition, it is designed to provide cross-flow exchange, and most of the time it leads to the flue gases being humidified excessively or to a phenomenon of condensate running down both sides of the exchanger walls, which often reduces heat exchanger efficiency. In general, it is difficult to control the condensates, and in any case auxiliary pumping or blowing installations consume energy in amounts that are often not negligible.

Proposals have also been made in Document FR-A-2 508 616 for a device that treats gases that are relatively hot and moist, e.g. flue gases, and gases that are relatively dry and cool, e.g. oxidizer gases for a hearth, for the purpose of recovering the heat and possibly the condensates from the flue gases and reheating and humidifying the combustion air. However, this prior treatment device uses two distinct enclosures, one having the hot moist gases passing therethrough while the other has the relatively dry and cool gases passing therethrough, with each of the enclosures including means at its top for spraying liquids constituted by the condensates recovered during the treatment. Here again, the treatment device is bulky because of the presence of two enclosures, and although its efficiency is acceptable, it is nevertheless limited. In addition, such an installation requires means to be implemented for balancing the flow rates through the various enclosures together with fluid transfer means (circulation pumps, blowers) that may give rise to considerable energy consumption related, in particular, to gas flow headlosses in the two enclosures, each of which is filled with metal packing.

The present invention seeks to remedy the above-mentioned drawbacks and to obtain higher efficiency when recycling the enthalpy of combustion products by using a heat and mass exchanger which is small in size and cheap to manufacture and operate.

Another object of the invention is to provide a heat and mass exchanger or "vapor pump" capable of being used in combination with various thermal processes that may or may not be associated with condensers and without it being necessary to proceed with difficult adaptations, particularly in the case of large installations such as boiler plants using condensation boilers.

SUMMARY OF THE INVENTION

The present invention provides a vapor pump constituted by a mass and heat exchanger providing energy and mass transfers between inlet combustion air and the combustion products from a thermal process that provides exchanges with a thermal load by direct contact or via a wall, wherein the vapor pump comprises an outer enclosure, a set of tubes constituting an exchanger disposed lengthwise inside the enclosure and opening out at their ends in respective first and second radial planes in which means are provided for positioning and supporting the tubes relative to the enclosure and for closing the empty spaces in the section of the enclosure situated outside the tubes, thereby defining between said radial planes a first gaseous fluid flow circuit inside the tubes and a distinct second gaseous fluid flow circuit inside the enclosure but outside the tubes, an inlet orifice for admitting a first gaseous fluid into the enclosure in said second circuit, an outlet orifice for exhausting from the enclosure said first gaseous fluid flowing in said second circuit, an inlet orifice for admitting a second gaseous fluid into the enclosure into said first circuit, and an outlet orifice for exhausting from said enclosure said second gaseous fluid flowing as a counter-flow in said first circuit, wherein one of said first and second gaseous fluid is constituted by hot moist combustion products while the other gaseous fluid is constituted by new combustion air, and wherein said vapor pump further includes humidifier means for moistening the air admitted into the enclosure, which humidifier means comprise a set of nozzles disposed to spray a fine mist of water to occupy a volume occupying the entire inlet section of the air flow circuit and the entire outlet section of the air flow circuit such that only those faces of the walls of the tubes that are in contact with the air are moistened, with the tubes defining a counter-flow exchanger between the air and the combustion products inside the enclosure without using an intermediate fluid and in which energy is transferred from the combustion products to the new air, from the combustion products to the sprayed water, and from the condensates of the combustion products to the sprayed water via the walls of the tubes while energy is transferred from the sprayed water to the air by means of direct contact.

The tubes have smooth walls and are advantageously constituted by tubes having a large heat exchange area, such as tubes of kidney-shaped cross-section, having two larger diameter portions put into communication via a narrow connecting portion.

Given the exchange efficiency, the tubes of the heat exchanger for exchanging heat between the combustion products and the air may be made of a synthetic material such as polyvinylidene fluoride or polyvinyl chloride, but they could also be made of metal, e.g. stainless steel.

Each nozzle constituting a component of the humidifier means may produce a jet in the form of a solid cone and may comprise a multiplicity of outlet orifices for spraying water in a fine mist throughout the volume of the cone whose apex is substantially constituted by the apex of the nozzle.

The various nozzles are disposed so that the water spray cones overlap.

In a first possible embodiment, the enclosure is disposed vertically and the humidifier means comprise a first set of nozzles directed downwards and disposed in the top portion of the enclosure so as to spray water over the entire section of the enclosure situated above the ends of the tubes constituting the air and flue gas heat exchanger, and a second set of nozzles directed upwards and disposed at the bottom of the enclosure so as to spray water over the entire section of the enclosure situated beneath the tubes.

In this case, a single pump may be used for feeding both the first set of nozzles and the second set of nozzles with water taken from a single water tank.

For an enclosure which is preferably disposed vertically in order to facilitate implementation of the vapor pump, the air is inserted into the first gaseous fluid flow circuit inside the tubes and the combustion products are inserted into the second gaseous fluid flow circuit inside the enclosure, but outside the tubes.

In another embodiment of the invention, the enclosure is disposed horizontally, and the humidifier means comprise a set of nozzles directed downwards and disposed in the top of the horizontal enclosure, being distributed over the entire length of the enclosure between the air inlet and outlet orifices.

For an enclosure which is disposed horizontally, the combustion products are inserted into the first gaseous fluid flow circuit inside the tubes and the air is inserted into the second gaseous fluid flow circuit inside the enclosure, but outside the tubes.

The vapor pump of the invention is advantageously used in combination with a thermal process that is already associated with a conventional condenser, and may thus constitute a super condenser in which the air humidifier means are fed with water from a tank containing the condensates from a first condenser.

The vapor pump of the invention may also be used advantageously in combination with a direct contact heat generating process of the washer-scrubber or submerged combustion type, with the air humidifier means being optionally fed with water from the block for recovering the condensate from the heat generator.

The vapor pump may further include an air valve disposed in an outlet duct connected to the moist combustion air outlet orifice in order to prevent water being entrained by capillarity to the combustion member associated with said thermal process.

The vapor pump of the invention may comprise a plurality of stages connected in cascade each comprising a common enclosure with a set of counterflow tubes for heat exchange between the air and the combustion products without using an intermediate fluid.

However, in a particular embodiment, in which the vapor pump has a vertical enclosure, it may comprise a plurality of sets of counterflow tubes for heat exchange between the air and the combustion products without using an intermediate fluid and disposed inside said common enclosure in compartments separated by vertical walls provided with first openings at one of their ends for passing air between pairs of adjacent compartments, and with a second opening disposed in the vicinity of the other end of the enclosure for passing the flow of combustion products through one of the vertical separation walls between the compartments, while maintaining distinct counterflow circuits for the air and the combustion products.

In a particular aspect of the invention, the vapor pump may further include a turbo compressor comprising a compressor situated on a duct for transporting combustion air and connected to the outlet orifice for saturated and superheated air, and a turbine situated on the outlet duct for the combustion products after they have passed through the vapor pump so that the combustion products are maintained under pressure inside the vapor pump while the combustion air is maintained at atmospheric pressure while it is passing through the vapor pump.

In this case, the vapor pump may further include a superheater disposed upstream from the compressor on said duct for transporting combustion air.

BRIEF DESCRIPTION OF THE DRAWINGS

Embodiments of the invention are described by way of example with reference to the accompanying drawings, in which:

FIG. 4 is an axial section through the essential components of a particular example of a vapor pump in accordance with the embodiment of FIGS. 1 and 2;

FIG. 5 is a view of the outlet face of a nozzle as used by the humidifier means installed in the vapor pump of the invention;

FIG. 6 is a diagrammatic view showing how two vertical exchange enclosures can be connected in cascade in order to constitute a vapor pump of the invention;

FIG. 7 is a diagrammatic view showing two vertical heat exchange assemblies separated by a vertical partition and connected in series within a single enclosure within a vapor pump of the invention;

FIG. 8 is an axial section view through the essential components of a vapor pump of the invention having an enclosure which is disposed horizontally;

DETAILED DESCRIPTION

Figure 1:
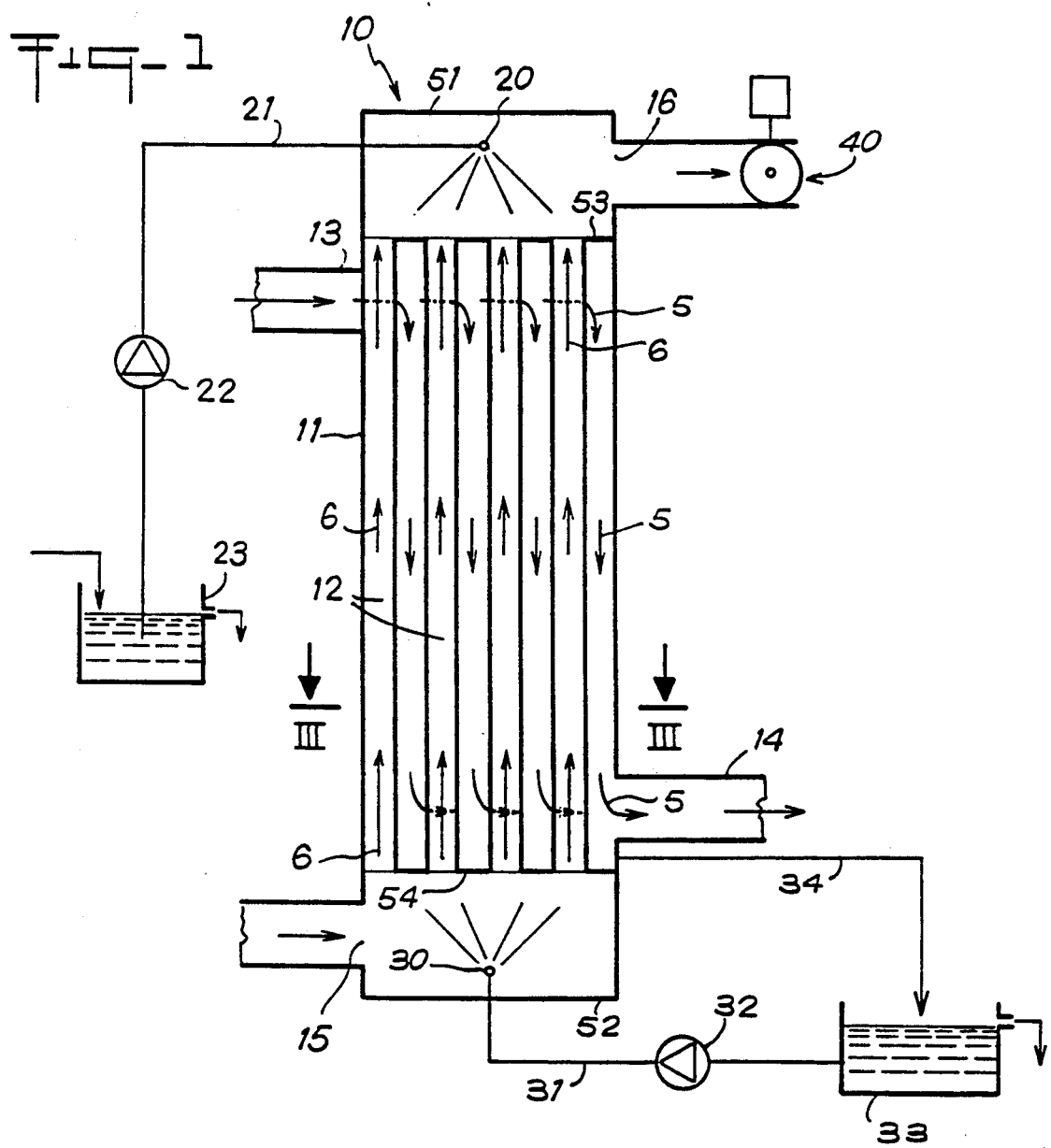
FIG. 1 is a diagrammatic vertical section view of a first embodiment of a vapor pump of the invention in which a single enclosure is disposed vertically.

FIG. 1 shows a first example of a mass and heat exchanger or "vapor pump" of the invention.

The vapor pump 10 essentially comprises a common vertical enclosure 11 inside which heat is exchanged between flue gases and combustion air. A plurality of vertical tubular walls 12 are disposed inside the enclosure 11 in such a manner that, in this example, the outside faces of the walls of the tubes 12 are in contact with the flue gases, which flue gases are not humidified, while the inside faces of the walls of the tubes 12 are in contact with cool combustion air which flows through the enclosure 11 inside the tubes 12 and which is humidified by means 20, 30 for spraying water or condensates. A new air inlet orifice 15 is formed in the enclosure 11 close to the bottom 52 thereof and beneath a bottom partition 54 for supporting the tubes 12 and closing off the empty spaces between the tubes 12, while an outlet orifice 16 for delivering air which has been heated and humidified is formed in the enclosure 11 in the vicinity of its top portion 51, above a top partition 53 for supporting the tubes 12 and closing off the empty spaces between the tubes 12.

A hot flue gas feed duct 13 passes through the enclosure 11 at a level immediately below the heated air outlet orifice 16 and beneath the top horizontal partition 53, while a cooled flue gas outlet duct 14 passes through the enclosure 11 at a level situated immediately above the new combustion air inlet orifice 15 and above the bottom horizontal partition 54. The flue gases represented by arrows 5 thus flow along the flue gas feed duct 13 which is in communication with the passages inside the enclosure 11 between the horizontal partitions 53 and 54 and situated outside the tubes 12, and after flowing down between the partitions 53 and 54 the flue gases leave the vapor pump 10 via the outlet duct 14.

Air represented by arrows 6 flows as a counterflow relative to the flue gases 5, i.e. upwards. On being inserted into the enclosure 11 via the inlet orifice 15, relatively cool and dry new air is humidified in a first humidifier device 30 disposed in the bottom of the enclosure 11 beneath the partition 54, and constituted to spray a fine mist throughout the inlet section of the air into the tubes 12 through the partition 54, with the mist being sprayed in the same direction as the flow of air, i.e. upwards.

A second humidifier device 20 is disposed at the top of the enclosure 11 and is designed to spray a fine mist throughout the air outlet section constituted by the outlet sections of the tubes 12 where they pass through the top partition 53, with this fine mist being sprayed downwards, i.e. as a counterflow relative to the flow of air leaving the tubes 12. The mists produced by the water injector devices 20 and 30 contribute to humidifying the combustion air and cause water to run down the inside faces of the walls of the tubes 12 which constitute the exchanger per se. Both the air and the water sprayed into the air are heated by making contact with the inside faces of the walls of the tubes 12 whose outside faces are in contact with the combustion products. As a result, droplets of water are vaporized and the combustion air is progressively saturated, while combustion products are condensed.

Figure 3:
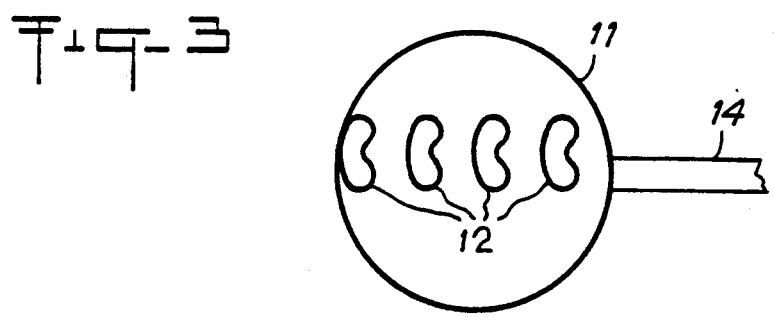
FIG. 3 is a section on line III—III of FIG. 1 showing the shape of the cross-section of the tubes constituting the heat exchanger placed inside the enclosure of the FIG. 1 vapor pump.

The tubes 12 preferably have a cross-section of special shape which improves exchange efficiency. As can be seen in FIG. 3, each tube 12 may thus have a cross-section which is kidney-shaped, having two portions of larger section interconnected by a narrow linking portion where a venturi effect is produced which maintains turbulence in the flow of gases travelling along the inside of the tube. In addition, the presence of a groove in the outside face of the kidney-shaped tubes, i.e. on the flue gas sides thereof, serves permanently to break up the film of water formed by the condensates, thereby preventing the condensates from behaving as an insulating film. The condensate film can break up naturally because a significant mass of water accumulates in the groove and becomes detached under its own weight.

The tubes 12 may be made of metal, e.g. a stainless steel. However, since the exchanger is capable of operating with flue gases at a relatively low temperature, in particular when the vapor pump is associated with a direct contact generator, the tubes 12 may be made of synthetic materials such as PVC or PVDF.

By way of example, a boiler for producing water or steam required for heating or for a process and fitted with a blown air burner may be associated with a condenser in which return water from the application or cold water for topping up purposes is used in a first exchange stage to cool the combustion products. The cooling causes the water vapor produced by the combustion to condense when the inlet temperature of the fluid to be heated lies below the dewpoint temperature of the combustion products. If the condenser used is capable of reducing the temperature of the combustion products down to a temperature of about 45° C., then the already partially cooled combustion products from which a portion of the water vapor has been removed may be applied to a vapor pump of the invention to give up a greater or lesser fraction of the energy still contained therein in the form of energy which is recycled by means of the combustion air as it is preheated and humidified on passing through the vapor pump.

In a vapor pump of the invention possessing an exchange surface constituted by the tubes 12 and fitted with two condensate spray heads 20 and 30, it is observed that the combustion air admitted at 10° C. with a relative humidity of 60% is raised to 42° C. with a relative humidity of 95%. Simultaneously, the flue gases which were at 45° C. on leaving the condenser are saturated at 25° C. when rejected.

In addition to the considerable savings that it provides, a vapor pump of the invention also serves to reduce the formation of nitrogen oxide which is often very considerable (greater than 50%). This phenomenon is due to obtaining a cooler flame because of the combustion air being "doped" with water vapor and because of the corresponding rarification of oxygen in the combustion air.

In a vapor pump of the invention and by using tubes 12 having one face that is in contact with flue gases only and another face which is in contact with air and spray water, simultaneous energy transfers take place between the combustion products and the combustion air under the four following forms:

dry transfer of energy from the glue gases to the air through the walls of the tubes 12;

dry transfer of the flue gas energy to the sprayed water via the walls of the tubes 12;

dry transfer of the flue gas condensate energy to the sprayed water via the walls of tubes 12; and direct transfer of energy from the sprayed water to the air within the air flow circuit.

An important aspect of the present invention lies in the water being sprayed into the air flow only and not being sprayed into the flue gas flow.

FIG. 1 shows a water tank 23 which may be constituted by a tank for collecting the condensates from a condensation heat generator or from a water condenser associated with a conventional boiler, but it could also be a tank containing water from an external source. In general, the vapor pump of the invention only requires a relatively small quantity of water and this may be pumped by a low flow rate pump 22 capable of operating on a few kilowatts of electrical power, for example. The water pumped by the pump 22 from the tank 23 is applied by a duct 21 to the top spray head 20 which is represented diagrammatically in FIG. 1 but which is designed to inject water in the form of a mist over the entire section of the enclosure 11 that is situated above the exchanger formed by the tube 12 and constituting the outlet section of reheated air for delivery via the outlet orifice 16.

The second water spray head 30 may be made in a similar manner to the top head 20 for the purpose of injecting water in the form of a mist over the entire section of the enclosure 11 that is situated beneath the exchanger formed by the tubes 12 and constituting the new air inlet section for air inserted via the inlet orifice 15. Water may be applied to the bottom spray head 30 via a duct 31 which is fed by a pump 32 with water contained in a tank 33. The tank 33 may receive condensates taken from the bottom ends of the tubes 12 via a duct 34.

Figure 2:
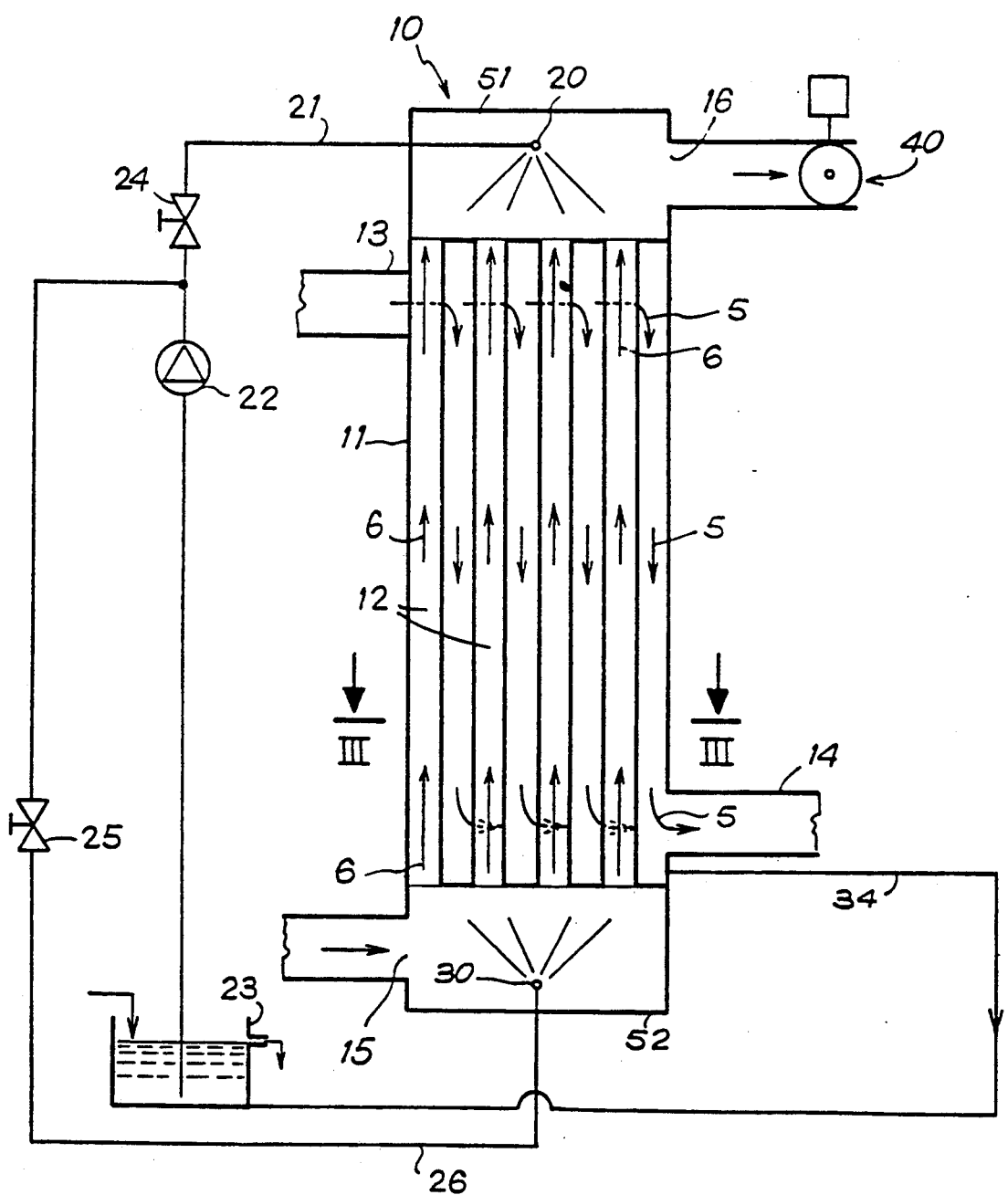
FIG. 2 is a diagrammatic view of a vapor pump similar to that of FIG. 1 but in which the water spraying means are fed from a single liquid supply by means of a single pump.

FIG. 2 shows a variant of the FIG. 1 embodiment in which the top and bottom spray heads 20 and 30 which constitute the means for humidifying the air inserted into the enclosure 11 are fed by means of a single pump 22 by means of lines 21 and 26 coming from a common tank 23 which may serve to collect condensates from a condenser as described above. Cocks 24 and 25 are disposed in the ducts 21 and 26 in order to adjust the rate at which water is injected via the spray heads 20 and 30. The embodiment shown in FIG. 2 requires only one electric pump 22, and as shown in the figure the condensates inside the exchanger outside the tubes 12 may be conveyed via a duct 34 to the tank 23.

FIGS. 1 and 2 show an air valve 40 disposed in the outlet duct connected to the air outlet orifice 16. The valve 40 thus serves to prevent water being entrained by capillarity to the burner, thus ensuring that the safety components associated with the burner do not trip and take it out of service.

As already mentioned above, the vapor pump of the invention is particularly well suited to operating in combination with a condensation heat generator, however it may also be installed on any thermal equipment by means of a recovery member or mechanical blowing.

When the vapor pump is installed as a branch on the flue of thermal equipment, the air and flue gas flow rates are balanced by installing a speed controller or an equivalent system on the recovery member.

It may be observed that if it is provided with a system for recovering and controlling condensates a vapor pump associated with a condensation heat generator may constitute a self-priming device that does not require any new outside water to be applied on starting.

In addition, since a vapor pump of the invention gives rise to flue gases that are cool and not very humid, it makes it possible to avoid lining chimneys which is always expensive.

The water spray means 20 and 30 used in a vertical enclosure vapor pump such as the vapor pump described above with reference to FIGS. 1 to 3 are now described in greater detail with reference to FIGS. 4 and 5.

Each water spray head 20, 30 comprises a spray strip 21, 31 provided with a series of nozzles 1 which may be essentially conical in shape having a large end face 2 with a series of small orifices 3 uniformly distributed over the entire area constituting the base of the cone. Each nozzle 1 thus sprays a fine mist of fine water droplets 4 over the entire inside volume of a cone whose apex is situated at the nozzle 1. The nozzles 1 are disposed in such a manner that the conical volumes filled with water droplets 4 overlap one another. Each device 20, 30 thus sprays a mist throughout the volume delimited by that portion of the enclosure 11 in which the inlet or outlet orifice 15 or 16 is formed and delimited by the corresponding endplate 53 or 54 supporting the ends of the tubes 12 through which the combustion air flows.

It is essential to use the spray means to establish a fine mist by virtue of their configuration and by virtue of the pressure applied to the nozzles, since that prevents a film of water forming too quickly over the length of the walls of the tubes 12 which would constitute thermal insulation.

The bottom water spray head 30 situated level with the air inlet orifice 15 is disposed in such a manner as to ensure that the water droplets are projected upwards in the air flow direction. The water sprayed into the bottom portion of the exchanger causes the air at the bottom of the exchanger to be supersaturated and facilitates low temperature priming. The water sprayed at the top of the exchanger in the vicinity of the air outlet takes place as a counterflow relative to the air flow direction.

In all cases, the water spray heads 20 and 30 form the fine mist only in the combustion air flow, and no water droplets are projected into the flue gas circuit which is isolated by means of the partitions 53 and 54 and the walls of the tubes 12.

A vapor pump of the invention may comprise a single stage as shown in FIGS. 1, 2, and 4, or else a plurality of similar stages may be disposed in cascade, as shown in FIG. 6.

FIG. 6 shows a vapor pump comprising two units 10a and 10b, each of which may be identical to the vapor pump shown in FIG. 4, for example, the vapor pumps sharing a common enclosure 11 with sets of heat exchanger tubes 12 (not shown in FIG. 6) being disposed therein together with water spray means 20 and 30 disposed at the top and the bottom of each enclosure 11. The air outlet orifice 16 from the first unit 10a is connected by a duct 7 to the air inlet orifice 15 of the second unit 10b. Similarly, the flue gas outlet duct 14 from the first unit 10a is connected via a link duct 18 to the flue gas inlet duct 13 of the second unit 10b. In FIG. 6, as in FIGS. 7 and 9, the path followed by the flue gases is shown by dashed lines 5 while the path followed by air is represented by dashed lines 6. The operation of the vapor pump shown in FIG. 6 is not described in detail since each unit 10a and 10b operates in exactly the same manner as the vapor pump shown in FIGS. 1, 2, or 4.

FIG. 7 shows an embodiment that is fairly similar to that of FIG. 6 except in that a plurality of exchange stages (two stages in the example shown) are disposed in series inside the same enclosure 11. In this case, partitions 55 and 56 separate the two consecutive stages and orifices 14b, 16b are formed through the partitions 55 and 56 in order to provide passages for the flue gases and the air between two successive stages. In the second stage, the flue gases 5 and the air flow in opposite directions to the directions in which they flow in the first stage, such that for a two-stage vapor pump integrated in a single enclosure 11 as shown in FIG. 7, the air outlet orifice 16 is at the bottom of the enclosure 11 while the flue gas outlet duct 14 is at the top of the enclosure 11. If a third stage is implemented, then the outlet orifices would return to the disposition shown in the embodiment of FIG. 4. Given the directions adopted for air flow in the embodiment shown in FIG. 7, a single water spray strip 20 may be used in the top of the enclosure 11, while two separate water spray strips 30a and 30b are disposed in the bottom of the enclosure 11 in two compartments separated by a partition 56. Each of the spray strips 20, 30a, and 30b may be made in the manner described with reference to FIGS. 4 and 5.

FIG. 8 shows a second embodiment of a vapor pump 110 of the invention which differs from the embodiment of FIG. 4 essentially by the enclosure 111 being disposed horizontally, having two end faces 151 and 152. The tubes 112 constituting the heat exchanger per se for exchanging heat between air and combustion products may be entirely analogous to the tubes 12 as shown in FIGS. 1 to 4, but they are disposed horizontally between two vertical endplates 153 and 154 which support the tubes 112 relative to the enclosure 111 and which provide separating partitions between the air and flue gas circuits. An inlet orifice for new air 115 is formed at the top of the enclosure 111 in the vicinity of tube support plate 153 and serves to feed a volume lying between the enclosure 111 and the tube support plates 153 and 154 with cool air 6 which flows from left to right in FIG. 8 around the tubes 112 extending lengthwise inside the enclosure 111 towards an air outlet orifice 116 situated in the bottom of the enclosure 111 in the vicinity of the tube support plate 154. A flue gas conveying duct 113 opens out into a chamber 157 delimited by the end 152 of the enclosure, the tube support plate 154, and a portion of the enclosure 111, thereby enabling flue gases to be inserted into the tubes 112, each of which has one end opening out into the chamber 157. The other end of each of the tubes 112 opens out through the plate 153 into a second end chamber 158 which is delimited by the end 151 of the enclosure, the tube support plate 153, and a portion of the enclosure 111. A flue gas exit duct 114 leading to the outside is in communication with the chamber 158. In contrast with the vertical tube embodiment shown in FIGS. 1 to 7, in the heat exchanger shown in FIG. 8, the flue gases 5 flow inside the tubes 112 (from right to left in FIG. 8), whereas the combustion air flows outside the tubes 112 essentially in a counterflow configuration (i.e. from left to right in FIG. 8). It may be observed that in a vertical enclosure vapor pump, as described with reference to FIGS. 1 to 7, it would also be possible to cause the flue gases to flow inside the tubes 12 and to cause the air to flow in the space outside the tubes 12. In which case the ends of the tubes 12 would be closed and the partitions 53 and 54 would have openings while the ducts 13 and 14 would be connected via manifolds to the ends of the tubes 12. However such an embodiment is more complex to provide because of the additional manifold ducting required to provide communication between the tubes 12 and the ducts 13 and 14.

The humidifier means 120 are constituted by a single water spray strip 121 provided with a set of nozzles 1 and located inside the enclosure 111, at the top thereof. This strip extends along the entire length of the heat exchanger constituted by the tubes 112, i.e. over its entire length between the support plates 153 and 154. The spray strip 120 is thus disposed in such a manner as to form a fine mist not only in the vicinity of the air inlet orifice 115 and in the vicinity of the air outlet orifice 116, but also throughout the entire intervening zone in which heat exchanges take place through the walls of the tube 112. Having the water sprayed throughout the length of the exchanger contributes to reducing temperature gradients and maintaining a more or less constant temperature in all sections of the enclosure from its air inlet 115 to its air outlet 116, whereas in a vertical enclosure vapor pump as shown in FIG. 4, the temperature exchanges that take place between the air and the flue gases through the walls of the tubes 12 give rise to a different sections of the enclosure being at different temperatures.

In any event, as for the vapor pump shown in FIGS. 1 to 4, in the embodiment of FIG. 8, water is sprayed by means of nozzles that produce jets occupying solid cones, which nozzles are similar to the nozzles already described with reference to FIGS. 4 and 5, said nozzles projecting fine water droplets into conical volumes that overlap, thereby establishing a fine mist throughout the inside volume of the enclosure 11 and outside the tubes 112. The combustion air flows through this volume.

Figure 9:
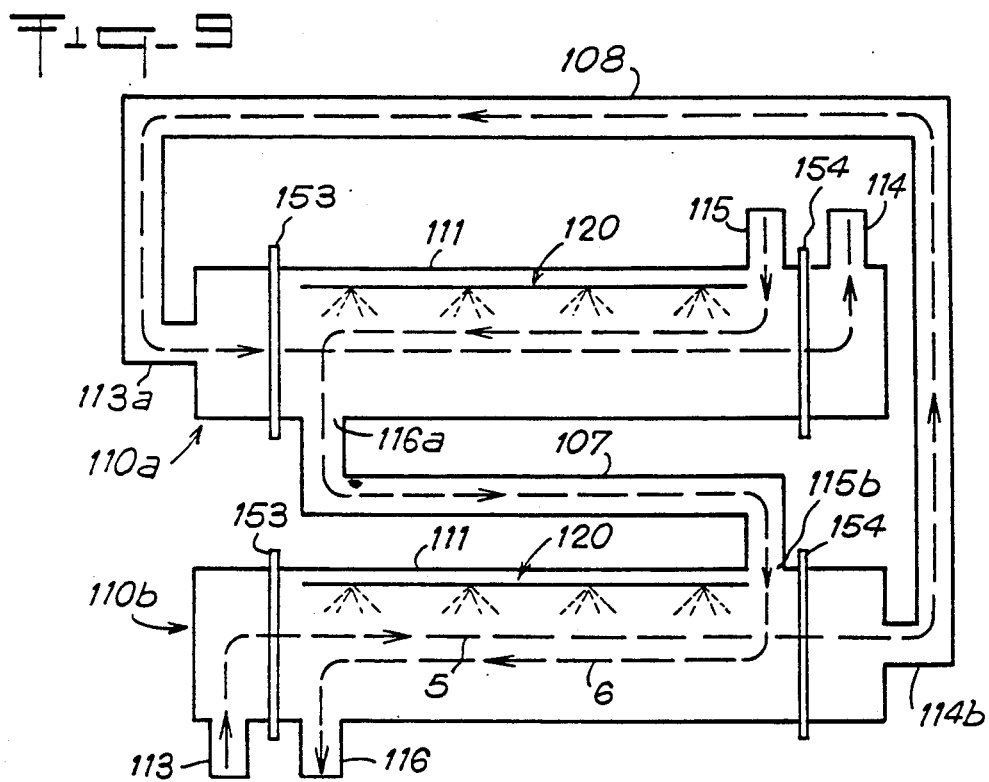
FIG. 9 is a diagrammatic view showing two horizontal exchange enclosures connected in cascade within a heat pump of the invention.

FIG. 9 shows two units 110a and 110b similar to the unit shown in FIG. 8 connected in cascade, thereby constituting a vapor pump having two stages in series. In this case, and in similar manner to the embodiment shown in FIG. 6, the air outlet orifice 116a from the first unit 110a is connected by a duct 107 to the air inlet orifice 115b of the second unit 110b, and the flue gas outlet duct 114b from the second unit 114b is connected by a link duct 108 to the flue gas inlet duct 113a to the first unit 110a. Naturally, the number of horizontal heat exchange units 110a, 110b that are connected in series may be greater than two.

Figure 10:
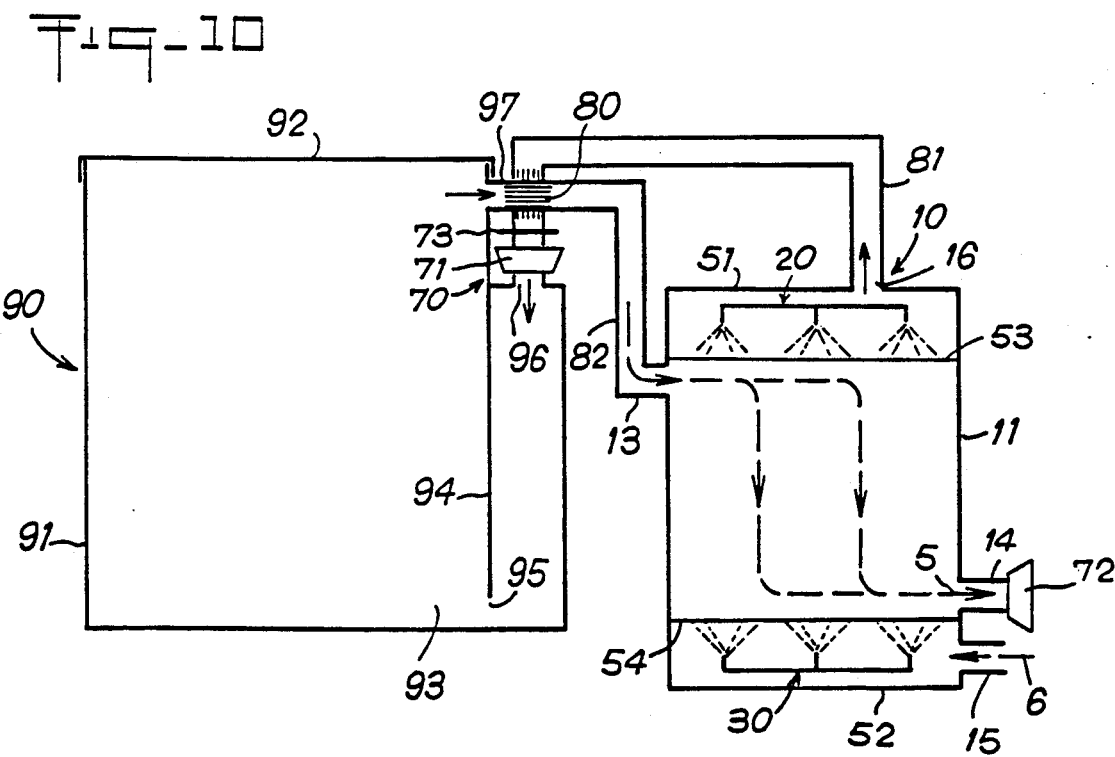
FIG. 10 is a diagrammatic view showing a vapor pump of the invention implemented in association with pressurizing means.

FIG. 10 shows an application of the vapor pump 10 of the invention to a direct contact heat generator rather than to a condensation boiler or the like.

Thus, FIG. 10 shows a heat generator 90 comprising a combustion chamber 94 which opens out via an opening 95 into an enclosure 91 containing a bath or a zone 93 serving to heat a fluid and operating by direct contact with the combustion products 94 via an air inlet orifice 96. The fuel, e.g. natural gas, enters the combustion chamber 94 via a conventional injector which is not shown. The enclosure 91 is closed at the top by a cover 92 which may be removable. The vapor products leave the bath 93 and are collected beneath the cover 92 prior to being removed via at least one exit orifice 97 for removing flue gases from the enclosure 91.

FIG. 10 shows a bath 93 of liquid such as water (which corresponds to submerged combustion), but the invention is equally applicable to a method proceeding by direct contact between the combustion products and a liquid, such as a washer-scrubber type device in which a liquid such as water is sprayed from a spray strip disposed inside the enclosure at a predetermined level above the bottom of the enclosure 91, the sprayed liquid coming into direct contact with the combustion products, and the liquid condensates being recovered from the bottom of the enclosure 91.

FIG. 10 shows a vapor pump 10 of the invention which may be implemented using either of the above-described embodiments and which is connected between the orifice 97 for removing flue gases from the enclosure 91 and the orifice 96 for feeding combustion air into the combustion chamber 94. The vapor pump is itself provided with at least one orifice 15 for admitting cool air 6, a flue gas outlet orifice 14, a moist hot air outlet orifice 16 connected by a duct 81 to the air inlet orifice 96 into the combustion chamber 94, and a saturated flue gas inlet orifice 13 connected by a duct 82 to the flue gas exit orifice 97 from the enclosure 91.

FIG. 10 also shows that it is possible to add pressurization means to the vapor pump 10 on the combustion product side while maintaining atmospheric pressure on the combustion air side.

The pressurization means may comprise a compressor driven by an electric motor and acting on the air flowing along the duct 81 connecting the air outlet orifice 16 from the vapor pump to the combustion air inlet orifice 96 into the combustion chamber 94. However, in this case no energy is recovered from flue gas expansion. Thus it is preferable for the pressurization means to comprise a small turbo compressor 70 which serves, in particular, to recover the expansion energy from the flue gases. This turbo compressor comprises a compressor 71 disposed between the vapor pump 10 and the combustion chamber 94 upstream from the combustion air inlet orifice 96 into the combustion chamber 94, and a turbine 72 which is advantageously disposed on the flue gas evacuation device 14 at the outlet from the vapor pump 10. A motor or a motor-compressor 73 for starting and boosting purposes may also be provided on the duct 81 for transferring combustion air. It may be observed that the expansion and compression device 70 may be placed in the vicinity of the combustion chamber 94 and the enclosure 91, or else it may be disposed on the ducts 81 and 82 in the vicinity of the vapor pump 10.

Optionally, a superheater 80 may be installed on the duct 81 for transferring combustion air, the superheater acting on the moist air leaving the vapor pump before it enters the compressor 71. If the air is saturated, it is generally desirable to superheat it by at least 5° C. The superheater 80 may be constituted, for example, by a heat exchanger exchanging heat between the flue gases leaving the bath 93 and escaping via the orifice 97 from the enclosure 91, and the moist air leaving the vapor pump 10 as transferred by the duct 81.

We claim:

1. A vapor pump having a mass and heat exchanger providing energy and mass transfers between inlet combustion air and combustion products from a thermal process that provides exchanges with a thermal load via a wall, wherein the vapor pump comprises:

an outer enclosure;
a set of tubes constituting an exchanger disposed lengthwise inside the closure and opening out at their ends in respective first and second radial planes in which positioning and supporting means are provided for positioning and supporting the tubes relative to the enclosure and for closing empty spaces in a section of the enclosure situated outside the tubes, thereby defining between the radial planes a first gaseous fluid flow circuit inside the tubes and a distinct second gaseous fluid flow circuit inside the enclosure but outside the tubes;
an inlet orifice for admitting a first gaseous fluid into the enclosure in the second circuit;
an outlet orifice for exhausting from the enclosure the first gaseous fluid flowing in the second circuit;
an inlet orifice for admitting a second gaseous fluid into the enclosure in the first circuit;
an outlet orifice for exhausting from the enclosure the second gaseous fluid as a counterflow in the first circuit, wherein one of the first and second gaseous fluids is constituted by hot moist combustion products while the other gaseous fluid is constituted by new combustion air;
humidifier means for moistening the air admitted into the enclosure, the humidifier means comprising a set of nozzles disposed to spray a fine mist of water to occupy a volume of the entire inlet section of the air flow circuit such that only those faces of walls of the tubes that are in contact with the air are moistened, the tubes defining a counterflow exchanger between the air and the combustion products inside the enclosure without using an intermediate fluid in which energy is transferred form the combustion products to the air, from the combustion products to the sprayed water, and from condensates of the combustion products to the sprayed water via the walls of the tubes while energy is transferred from the sprayed water to the air by means of direct contact; and
deriving means for deriving from the condensates at least a portion of the sprayed water;
wherein the enclosure is disposed vertically, and
wherein the humidifier means comprises a first set of nozzles directed downwards and disposed in a top portion of the enclosure so as to spray the water over the entire section of the enclosure situated above ends of the tubes, and a second set of nozzles directed upwards and disposed at a bottom of the enclosure so as to spray the water over the entire section of the enclosure situated beneath the tubes.

2. A vapor pump according to claim 1, wherein the tubes have smooth walls.

3. A vapor pump according to claim 1, wherein the tubes are constituted by tubes having a large heat exchange area.

4. A vapor pump according to claim 3, wherein the tubes are constituted by tubes of kidney-shaped cross section having two portions put into communication via a narrower connection portion.

5. A vapor pump according to claim 1, wherein the tubes of the heat exchanger for exchanging heat between the combustion products and the air are made of a synthetic material.

6. A vapor pump according to claim 5, wherein the tubes are made of polyvinylidene fluoride.

7. A vapor pump according to claim 5, wherein the said tubes are made of polyvinyl chloride.

8. A vapor pump according to claim 1, wherein each nozzle constituting a component of the humidifier means produces a jet in the form of a solid cone and comprises a multiplicity of outlet orifices for spraying water in a fine mist throughout the volume of the cone whose apex is substantially constituted by the apex of the nozzle.

9. A vapor pump according to claim 8, wherein the various nozzles are disposed so that the water spray cones overlap.

10. A vapor pump according to claim 1, wherein the air is inserted into the first gaseous fluid flow circuit inside the tubes and the combustion products are inserted into the second gaseous fluid flow circuit inside the enclosure, but outside the tubes.

11. A vapor pump according to claim 1, including a single pump for feeding both the first set of nozzles and the second set of nozzles from a single water tank.

12. A vapor pump according to claim 1, wherein the air humidifier means are fed with water from a tank containing the condensates from a first condenser.

13. A vapor pump according to claim 1, further including an air valve disposed in an outlet duct connected to the moist combustion air outlet orifice in order to prevent water being entrained by capillarity to the combustion member associated with said thermal process.

14. A vapor pump according to claim 1, comprising a plurality of stages connected in cascade each comprising a common enclosure with a set of counterflow tubes for heat exchange between the air and the combustion products without using an intermediate fluid.

15. A vapor pump according to claim 1, comprising a plurality of sets of counterflow tubes for heat exchange between the air and the combustion products without using an intermediate fluid and disposed inside said common enclosure in compartments separated by vertical walls provided with first openings at one of their ends for passing air between pairs of adjacent compartments, and with a second opening disposed in the vicinity of the other end of the enclosure for passing the flow of combustion products through one of the vertical separation walls between the compartments, while maintaining distinct counterflow circuits for the air and the combustion products.

16. A vapor pump according to claim 1, further including a turbo compressor comprising a compressor situated on a duct for transporting combustion air and connected to the outlet orifice for saturated and superheated air, and a turbine situated on the outlet duct for the combustion products after they have passed through the vapor pump so that the combustion products are maintained under pressure inside the vapor pump while the combustion air is maintained at atmospheric pressure while it is passing through the vapor pump.

17. A vapor pump according to claim 16, further including a superheater disposed upstream from the compressor on said duct for transporting combustion air.

* * * * *